Dec. 31, 1935.  G. A. BRANDLIN  2,026,267
OIL TESTER
Filed Aug. 16, 1933
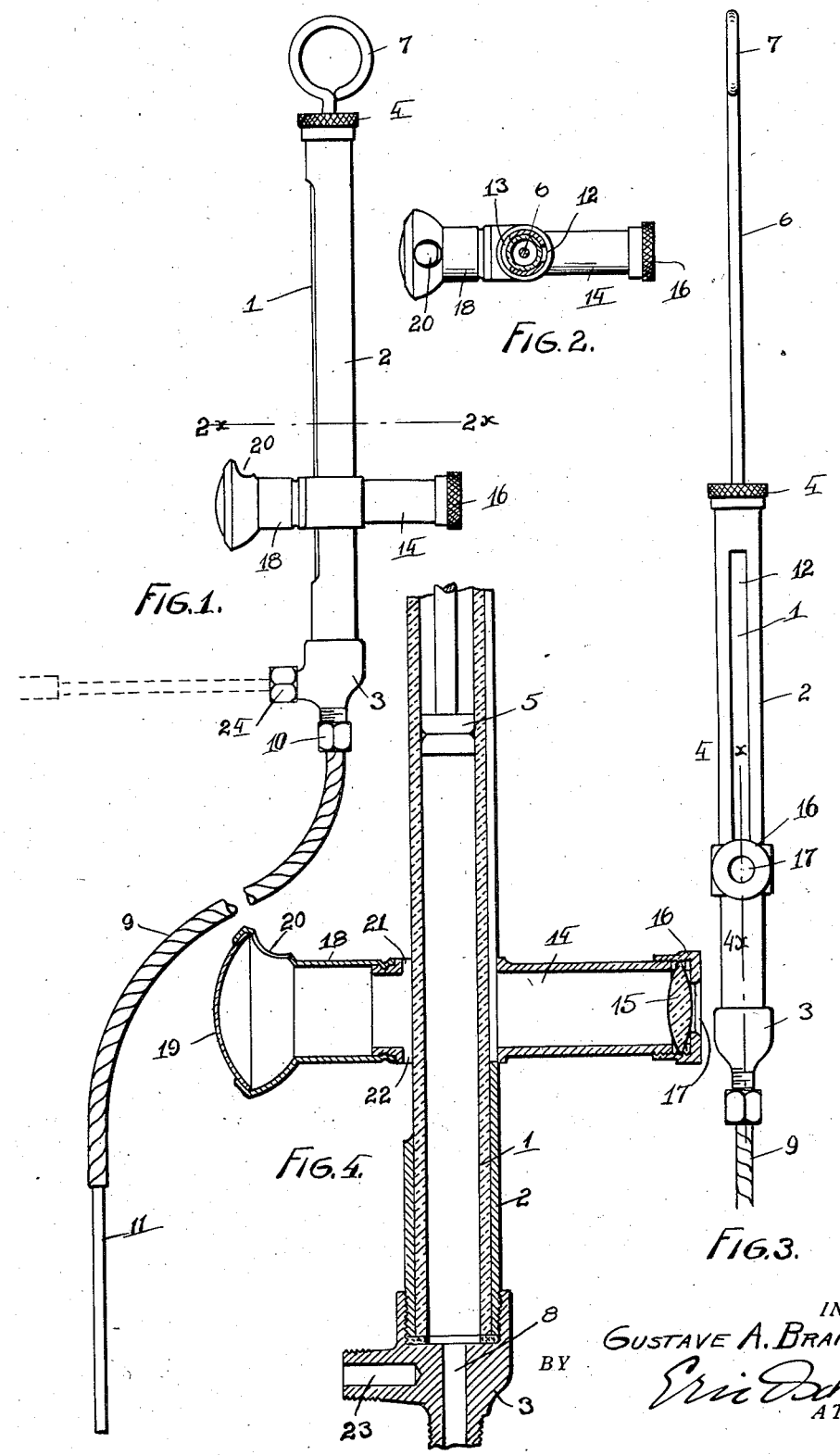
INVENTOR
GUSTAVE A. BRANDLIN
BY
ATTORNEY Patented Dec. 31, 1935

2,026,267

UNITED STATES PATENT OFFICE 2,026,267

OIL TESTER

Gustave A. Brandlin, Rochester, N. Y.

Application August 16, 1933, Serial No. 685,320

7 Claims. (Cl. 88—14)

This invention relates to oil testers and more especially to means for visually determining the condition of the lubricating oil in the crank case of an internal combustion engine.

The objects of the invention are to provide an instrument with which a quantity of the lubricating oil may be withdrawn from the crank case of the engine and visually observed to determine the condition of the oil with respect to deterioration, dicoloration and increased opacity incident to use, to provide means for magnifying a part of the oil withdrawn from the engine to detect any sediment in the oil and to provide universally adjustable light reflecting means which make possible the illumination of the oil from any light source whatsoever for the proper observation of the magnified portion of the oil.

These and other objects of the invention will become more readily apparent from a detailed description of one embodiment thereof, reference being had to the accompanying drawing in which Figure 1 is a side elevation of the oil tester.

Figure 2 is a horizontal sectional view of the oil tester, the section being taken on the line $2x$—$2x$ of Figure 1.

Figure 3 is a front elevation of the oil tester.

Figure 4 is an enlarged vertical sectional view of the lower portion of the oil tester, the section being taken on the line $4x$—$4x$ of Figure 3.

In the several figures of the drawing like reference numerals indicate like parts.

Referring more in detail to the figures of the drawing, the preferred embodiment illustrated comprises a glass tube 1 which is fastened and sealed into the sleeve 2 by the nipple 3 at the bottom and the cap 4 at the top thereof. Within the glass tube is mounted the piston 5 which is operated thru the piston rod 6 by the handle 7. The nipple 3 has the duct 8 leading therethru in line with the glass tube and a flexible tubing 9 is fastened to the nipple by means of the sleeve nut 10 to provide a flexible extension of this duct. The flexible tubing has a rigid tube extension 11 at the outer end thereof so as to provide an intake that will readily project into the oil when the flexible tubing is inserted into the crank case.

The front of the sleeve 2 is provided with the longitudinal slit 12 and diagonally opposite thereto at the back of the sleeve is provided the slit 13. When therefore oil is drawn into the glass tube 1 by the piston 5, the oil may be visually observed in the gauge tube by looking into the slit 12. The slit 13 in the sleeve 2 admits sufficient light into the back of the gauge tube to provide the proper illumination of the oil for the inspection of the condition of the oil with respect to its deterioration, discoloration and increased opacity incident to use.

This examination gives a fair indication of the condition of the oil, but may be misleading as to the sediment and carbon that is contained therein. For this reason the oil tester so far described is combined with magnifying means. This consists of a horizontal sight tube 14 which projects from the front of the glass tube 1 in line with the slit 12 in the sleeve 2 near the bottom thereof. Mounted in the outer end of this sight tube in focus with the center of the glass tube is the magnifying lens 15. This magnifying lens is held in place by the cap 16 which is provided with the sight opening 17.

At the back of the glass tube diametrically opposite to the sight tube 14 and in line therewith is provided the light tube 18. This light tube is adapted to rotate on a short extension of the sight tube 14 and is enlarged at the outer end to hold the convex reflector 19. This reflector is also focused on the center of the glass tube and is adapted to collect and focus the light entering the opening 20 onto the oil located in the glass tube.

By examining the oil thru the magnifying lens, any foreign matter contained in the oil which is not clearly visible to the naked eye is made visible due to the enlargement of it and the intense illumination thereof by means of the light reflector.

In the use of the tester during the day, light can enter thru the slit 13 in the sleeve 2 above and below the extension of the sight tube as indicated at 21 and 22 in Figure 4 and this is sufficient for the illumination of the portion of the oil in the gauge glass which is being magnified. At night however, or at any time when artificial light is required for illumination, this light source may be of any kind and located anywhere as the light tube can be turned into any angular position to bring its opening in line with the light source to permit sufficient light to be collected and focused onto the oil by the reflector 19. A flash light held to project its light into the opening 20 of the sight tube will produce ideal illumination of the oil.

After the glass tube has been filled with oil and the flexible tube with its intake extension pipe is withdrawn from the crank case, the intake is slipped into the blind sleeve 23 at the back of the nipple 3 and held in place therein by a suitable sleeve nut 24. This closes the end of the intake pipe and keeps the tube from draining or dripping while the oil is being tested as above described.

I claim:

1. In an oil tester for visually examining lubricating oil, the combination of a transparent tube having an inlet at the bottom thereof, a sleeve having a pair of longitudinal slots at diametrically opposite sides surrounding said transparent tube, a sight tube mounted upon said sleeve at right angles from said sleeve in line with said longitudinal slots and a magnifying lens in said sight tube in focus with said transparent tube, a piston mounted in said transparent tube and means for operating said piston to cause the oil to enter said inlet and rise in said transparent tube to the level of said sight tube.

2. In an oil tester for visually examining lubricating oil, the combination of a transparent tube having an inlet at the bottom thereof, a sight tube extending from said transparent tube substantially at right angles thereto; a sleeve having a pair of longitudinal slots at diametrically opposite sides thereof surrounding said tube, a piston mounted in said transparent tube and means for operating said piston to cause the oil to enter said inlet and rise in said transparent tube to the level of said sight tube, a cap at the top of said sleeve and a nipple at the bottom of said sleeve for locking and sealing said tube into said sleeve, a flexible intake extending from said nipple, a rigid extension on the end of said flexible intake and combined holding and closing means in the side of said nipple to receive and hold said rigid extension of said intake to keep it from dripping and keep said piston from forcing the oil from said transparent tube.

3. In an oil tester for visually examining lubricating oil, the combination of a transparent tube having an inlet at the bottom thereof adapted to receive the oil to be tested, a sight tube laterally extending from one side of said tube, a light tube having an opening in the wall thereof extending laterally from the opposite side of said tube and a reflector closing the end of said light tube and arranged to reflect the light entering the opening in said light tube against said transparent tube, a piston mounted in said transparent tube and means for operating said piston to cause the oil to enter said inlet and rise in said transparent tube to the level of said sight tube.

4. In an oil tester for visually examining lubricating oil, the combination of a transparent tube having an inlet at the bottom thereof adapted to receive the oil to be tested, a sight tube laterally extending from one side of said transparent tube, a magnifying lens mounted in said sight tube, a light tube laterally extending from the opposite side of said transparent tube, a reflector housing having an opening in the side wall thereof mounted to rotate at the end of said sight tube and a reflector mounted in said housing to reflect the light entering said opening onto said transparent tube.

5. In an oil tester for visually examining lubricating oil, the combination of a transparent tube having an inlet at the bottom thereof, an opaque tubing surrounding said transparent tube having a pair of longitudinal slits at diametrically opposite sides thereof, a horizontal sight tube extending laterally from the bottom of one of said slits and an extension of said sight tube extending laterally from the slit in the opposite side of said tube with the slit extending above and below said sight tube extension, a piston mounted in said transparent tube and means for operating said piston to cause the oil to enter said inlet and rise in said transparent tube to the level of said sight tube.

6. In a combined sample withdrawing and testing instrument for withdrawing a sample quantity of liquid from a container and raising it to a predetermined elevation in the instrument for visually examining the liquid, the combination of a transparent tube, a sight tube carried by said transparent tube intermediate the ends thereof, an inlet at the bottom of said transparent tube, a piston mounted within said transparent tube and a handle for operating said piston at the top of said transparent tube to permit the operation of said piston to cause the liquid to rise in the transparent tube to a level in line with said sight tube and move said piston above the level of the sight tube.

7. In a combined sample withdrawing and testing instrument as set forth in claim 6 in combination with bendable means connected to the inlet of the transparent tube for temporarily holding the liquid in the transparent tube and permit the intake of the liquid, the testing and the discharge thereof with the tube in a substantially vertical position.

GUSTAVE A. BRANDLIN.